(12) United States Patent
Siomina et al.

(10) Patent No.: US 8,737,998 B2
(45) Date of Patent: May 27, 2014

(54) METHOD AND ARRANGEMENT FOR PROCESSING OF NEIGHBOR CELL INFORMATION

(75) Inventors: Iana Siomina, Solna (SE); Muhammad Ali Kazmi, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 271 days.

(21) Appl. No.: 12/949,415

(22) Filed: Nov. 18, 2010

(65) Prior Publication Data

US 2011/0201332 A1    Aug. 18, 2011

Related U.S. Application Data

(60) Provisional application No. 61/305,440, filed on Feb. 17, 2010.

(30) Foreign Application Priority Data

Nov. 12, 2010 (WO) .................. PCT/EP2010/067359

(51) Int. Cl.
*H04Q 7/20* (2006.01)
(52) U.S. Cl.
USPC ..................... 455/436; 455/435.1; 455/435.2; 455/438; 455/439; 455/442; 455/446; 455/449; 455/452.2; 455/453
(58) Field of Classification Search
None
See application file for complete search history.

(56) References Cited

U.S. PATENT DOCUMENTS

| | | | |
|---|---|---|---|
| 6,201,968 B1 | 3/2001 | Ostroff et al. | |
| 7,013,141 B2 * | 3/2006 | Lindquist et al. | 455/435.1 |
| 2005/0130655 A1 | 6/2005 | Lundh et al. | |
| 2008/0113670 A1 | 5/2008 | Dufour et al. | |

FOREIGN PATENT DOCUMENTS

| | | |
|---|---|---|
| EP | 1962535 A1 * | 8/2008 |
| WO | 2010/114081 A1 | 10/2010 |

OTHER PUBLICATIONS

3rd Generation Partnership Project. "3rd Generation Partnership Project; Technical Specification Group Radio Access Network; Evolved Universal Terrestrial Radio Access (E-UTRA); Physical Channels and Modulation (Release 9)." 3GPP TS 36.211, V9.0.0, Dec. 2009, pp. 1-85, Sophia Antipolis Valbonne, France.
3rd Generation Partnership Project. "3rd Generation Partnership Project; Technical Specification Group Radio Access Network; Evolved Universal Terrestrial Radio Access (E-UTRA) Radio Resource Control (RRC); Protocol specification (Release 8)." 3GPP TS 36.331, V8.8.0, Dec. 2009, pp. 1-211, Sophia Antipolis Valbonne, France.

* cited by examiner

*Primary Examiner* — Olumide Tajibade Akonai
*Assistant Examiner* — Randy Peaches
(74) *Attorney, Agent, or Firm* — Coats and Bennett, P.L.L.C.

(57) ABSTRACT

Methods and arrangements for improving the selection of neighbor cells, on which to perform measurements in different situations. The method in a first node involves obtaining information identifying a first and a second set of neighboring cells for a respective first and second measurement category. A third set of neighboring cells is then determined based on at least parts of the obtained information related to the first and second set. Measurements are then performed in a third measurement category on at least part of the cells in the third set of neighboring cells. The methods and arrangements enable combination of information on neighbor cells, obtained in different ways for different measurement categories into a combined set of neighbor cells, which is more suitable for measurements in a certain measurement category than a set of cells previously obtained for performing measurements in said measurement category.

48 Claims, 12 Drawing Sheets

METHOD AND ARRANGEMENT FOR PROCESSING OF NEIGHBOR CELL INFORMATION

RELATED APPLICATIONS

This application claims priority to U.S. Provisional Patent Application Ser. No. 61/305,440, filed 17 Feb. 2010, and International Application No. PCT/EP2010/067359, filed 12 Nov. 2010, both of which are incorporated herein by reference in their entirety.

TECHNICAL FIELD

The invention relates to processing of neighbor cell information, such as neighbor cell lists (NGLs), which can be used for performing measurements in various situations.

BACKGROUND

The possibility of identifying the geographical location of a mobile terminal or other node in a network has enabled a large variety of commercial and non-commercial services, e.g., navigation assistance, social networking, location-aware advertising and emergency calls. Different services may have different positioning accuracy requirements imposed by the application. In addition, some regulatory requirements on the positioning accuracy for basic emergency services exist in some countries, i.e. the FCC (Federal Communications Commission) E911 in the USA.

In many environments, the geographical position of a node can be accurately estimated by using positioning methods based on GPS (Global Positioning System). Today, networks also often have the possibility to assist e.g. UEs (User Equipment) in order to enable the UEs to perform measurements at much lower receiver sensitivity level and improve GPS cold start or start up performance through so called A-GPS (Assisted-GPS) positioning. However, GPS, or A-GPS, receivers are not necessarily available in all wireless terminals. Furthermore, GPS is known to often fail in indoor environments and urban canyons, due to lack of satellite coverage. A complementary terrestrial positioning method, called Observed Time Difference of Arrival (OTDOA), has therefore been standardized by 3GPP ($3^{rd}$ Generation Partnership Project).

OTDOA Positioning

With OTDOA, a mobile terminal measures the timing differences for downlink reference signals received from multiple distinct locations. For each neighbor cell to be measured, the UE measures Reference Signal Time Difference (RSTD) which is the relative timing difference between the neighbor cell and a reference cell. The UE position estimate is then found as the intersection of hyperbolas corresponding to the measured RSTDs. An example of an OTDOA scenario is illustrated in FIG. 1. At least three measurements from geographically dispersed base stations with a good geometry are needed to solve for two coordinates of the terminal and the receiver clock bias. In order to obtain an estimate of the geographical position, precise knowledge of the transmitter locations and transmit timing offset is needed. Position calculation can be conducted, for example, by a positioning server, such as the eSMLC (evolved Serving Mobile Location Center) in Long Term Evolution (LTE), or by a UE. The former approach corresponds to the UE-assisted positioning mode which is the only OTDOA mode standardized so far in 3GPP, whilst the latter corresponds to the UE-based positioning mode.

To enable positioning in LTE and facilitate positioning measurements of a proper quality and for a sufficient number of distinct locations, new physical signals have been introduced, namely so called Positioning Reference Signals (PRSs), which are dedicated for positioning. Further, low-interference positioning sub-frames have been specified in 3GPP.

The PRS are transmitted from one antenna port according to a pre-defined pattern, as described in 3GPP TS 36.211, Evolved Universal Terrestrial Radio Access (E-UTRA); Physical Channels and Modulation. A frequency shift, which is a function of PCI (Physical Cell Identity), can be applied to the specified PRS patterns to generate orthogonal patterns and thus enable an effective frequency reuse of six. The use of such a frequency shift makes it possible to significantly reduce neighbor cell interference on the measured PRS and thus improve positioning measurements. OTDOA assistance information and neighbor cell lists.

Since for OTDOA, positioning PRS signals from multiple distinct locations need to be measured, the UE receiver may have to deal with PRS that are much weaker than those received from the serving cell. Furthermore, without the approximate knowledge of when in time the measured signals are expected to arrive, and what the exact PRS pattern is, the UE would need to do signal search within a large window, which would have an impact on the time and accuracy of the measurements, as well as the UE complexity. To facilitate UE measurements, the network therefore transmits assistance data to the UE, which includes e.g. an NCL comprising the physical cell identities (PCIs) of neighbor cells, the number of consecutive downlink positioning subframes, PRS transmission bandwidth, etc. The NCL may also comprise the cell identity of the serving cell. The serving cell may thus be considered to be included in the term "neighboring cells", when appropriate.

The neighbor cell lists are typically defined by the network and then signaled to UEs over LPP (LTE Positioning Protocol). The PCI of a cell maps to the PRS pattern. Hence, from the received assistance information, the UE should be able to deduce the sequence transmitted from each neighbor cell indicated in the assistance data, PRS pattern, etc. The lists may also provide additional information, such as the expected signal quality of signals from the corresponding cells. Such information may be explicit, e.g. such as when a quality metric is signaled together with each neighbor cell identity, or it may be implicit, e.g., such as when the neighbor cells are just arranged in a certain order in the list according to some criteria, and the UE is able to correctly interpret the order.

It has been agreed in 3GPP that the maximum size of positioning neighbor cell lists is 24 cells per carrier. In multi-carrier system, which comprises more than one carrier, generally known as a component carrier, a neighbor cell list may be signaled for each component carrier, i.e. 24 cells per component carrier.

There have been intensive discussions in 3GPP regarding what maximum number of cells to use in the positioning neighbor cell list. From the UE-side perspective, large lists lead to increased UE complexity, require larger buffers, longer measurement time until the position fix, etc., as compared to smaller lists. However, to ensure performance of measurements on the required number of neighbor cells, and the required positioning accuracy, the neighbor cell lists need to be sufficiently large, also to take into account the dynamic nature of the traffic and radio environment in general. Because of the latter, it is a very challenging task when configuring the network to design reasonably short, but yet reliable UE-specific neighbor cell lists. This becomes even more complicated, for example, due to the flexibility of LTE deployment scenarios in terms of synchronization (LTE can be synchronous or asynchronous) and supported duplex modes (FDD, TDD or half duplex).

Therefore, the maximum size of positioning neighbor cell lists agreed for LTE, i.e. 24 cells per carrier, is smaller than for corresponding lists in, e.g., UTRAN, with 32 neighbor cells per carrier, or CDMA2000, with 40 neighbor cells per carrier. This makes implementation of positioning network solutions more complicated and less compatible, and may require a significant network re-planning, which is typically very costly for operators. Also, UE design and algorithms may become less consistent among different systems and more difficult to adapt from one system to another, although the recent trend is that a UE supports multiple radio access technologies.

The different requirements of the number of identified neighbor cells needed in order to e.g. achieve measurements of a required quality, and the conflicting interests regarding the size of neighbor cell lists described above, have been identified as a problem, since UEs may not have access to adequate information on a sufficient number of neighbor cells for performing certain measurements.

SUMMARY

Embodiments herein advantageously enable a network node to obtain a sufficient number of identified reliable neighbor cells for performing measurements for different purposes. In particular, embodiments include a method and an arrangement for enabling the obtaining and combining of information related to the identity of neighbor cells, with the purpose of performing measurements on said neighbor cells.

According to a first aspect, a method is provided in a first node in a cellular communication network. The method involves obtaining information related to identities of a first set of one or more neighboring cells for a first measurement category. The method further involves obtaining information related to identities of a second set of one or more neighboring cells for a second measurement category. Further, a third set of neighboring cells is determined, based on at least parts of the obtained information related to the first and second set. Further, measurements are performed in a third measurement category on at least part of the cells in the third set of neighboring cells.

According to a second aspect, an arrangement is provided in a first node in a cellular communication network. The arrangement comprises a functional unit, adapted to obtain information related to identities of a first set of one or more neighboring cells for a first measurement category, and further adapted to obtain information related to identities of a second set of one or more neighboring cells for a second measurement category. The arrangement further comprises a functional unit, adapted to determine a third set of neighboring cells based on at least parts of the obtained information related to the first and second set. The arrangement further comprises a functional unit, adapted to perform measurements in a third measurement category on at least part of the cells in the third set of neighboring cells.

The above method and arrangement may be used for improving the selection of neighbor cells on which measurements may be performed in different situation. For example, information on neighbor cells originally obtained for performing measurements in a certain measurement category may be combined with other information on neighbor cells and be used for performing measurements in a different measurement category. Thus, the amount of identified candidate neighbor cells on which measurements could be performed may be extended, and thus enable the access to a sufficient number of identified reliable neighbor cells.

The above method and arrangement may be implemented in different embodiments. The obtained information on the respective first and second set may be received as a neighbor cell list from another node, or be at least partly blindly detected. Thus, two neighbor cell lists designed for different measurement categories, or one list and a set of blindly detected neighbor cells could be combined and used for performing measurements. The received neighbor cell lists may comprise assistance data for positioning, such as e.g. a list of cells transmitting positioning reference signals.

In some exemplary embodiments, at least parts of the respective information related to the first and second set may be combined into a list, which may be provided to a second node.

The measurement categories mentioned may be, e.g. positioning; mobility; Self Organizing Network (SON); tracking area update, Operations and Maintenance (O&M); minimization of drive tests; network planning and optimization or—interference coordination in heterogeneous networks.

The first node may be, e.g. a mobile terminal, a base station, a relay node or a positioning node.

In some embodiments, it may be determined, based on the obtained information, whether to perform a verification of a cell detected for the first or the second measurement category. For example, verification of a cell, detected for the first or the second measurement category, may be performed when the identity of the cell is not present in the obtained information related to neighboring cells obtained for the other one of the first or the second measurement category. Further, the neighboring cells identified both in the information related to the first set and the information related to the second set may be the ones selected to be comprised in the third set.

In some embodiments, the obtaining of information for the first and/or second measurement category may involve the triggering of a transmission of a neighbor cell list from another node. The triggering may involve the transmission of a positioning session request or initiation. The triggering may further involve comparing an estimated and a required positioning quality.

In some embodiments, the third set or list is based on the information related to a first set of neighboring cells (Info1) and the information related to a second set of neighboring cells (Info2), combined as: Info1∪Info2. Verification of a cell, detected for the first or the second measurement category, may be performed when the identity of the cell is not present in the combined obtained information.

The different features of the exemplary embodiments above may be combined in different ways according to need, requirements or preferences.

The above exemplary embodiments have basically been described in terms of a method in a network node. However, the described arrangement for combining information and using combined information has corresponding embodiments where different functional units are adapted to carry out the above described method embodiments. Further, corresponding embodiments for a method and arrangement for receiving and using said combined information in a second node are provided.

According to yet another aspect, a computer program product is provided, which comprises a computer program, comprising code means, which when run in an arrangement according to any embodiment described herein, will cause the arrangement to perform a procedure according to any of the embodiments described herein.

Embodiments herein thus advantageously provide more flexibility in cell measurements for various UE and network services. Indeed, the set of cells on which measurements are performed may be extended and/or adapted dynamically. Further, enhanced neighbor cell measurements in difficult scenarios, e.g. heterogeneous networks, dense deployments, etc., may be enabled. Further, there may be increased possibilities for UE features and a possibility to shift network complexity to the UE side without complicating network design. Dynamical creation of an expanded NCL by the combining of e.g. an NCL for one measurement category and cells detected for another measurement category will be enabled. Further, improved false cell detection by use of alternative NCL will be enabled. Further, applying embodiments of the invention may lead to an improved measurement reliability, due to e.g. that the neighbor cells on which measurements are performed for a certain purpose are more suitable than the cells in a list of cells provided for the purpose by the network.

BRIEF DESCRIPTION OF THE DRAWINGS

The invention will now be described in more detail by means of exemplary embodiments and with reference to the accompanying drawings, in which.

DETAILED DESCRIPTION

Figure 1:
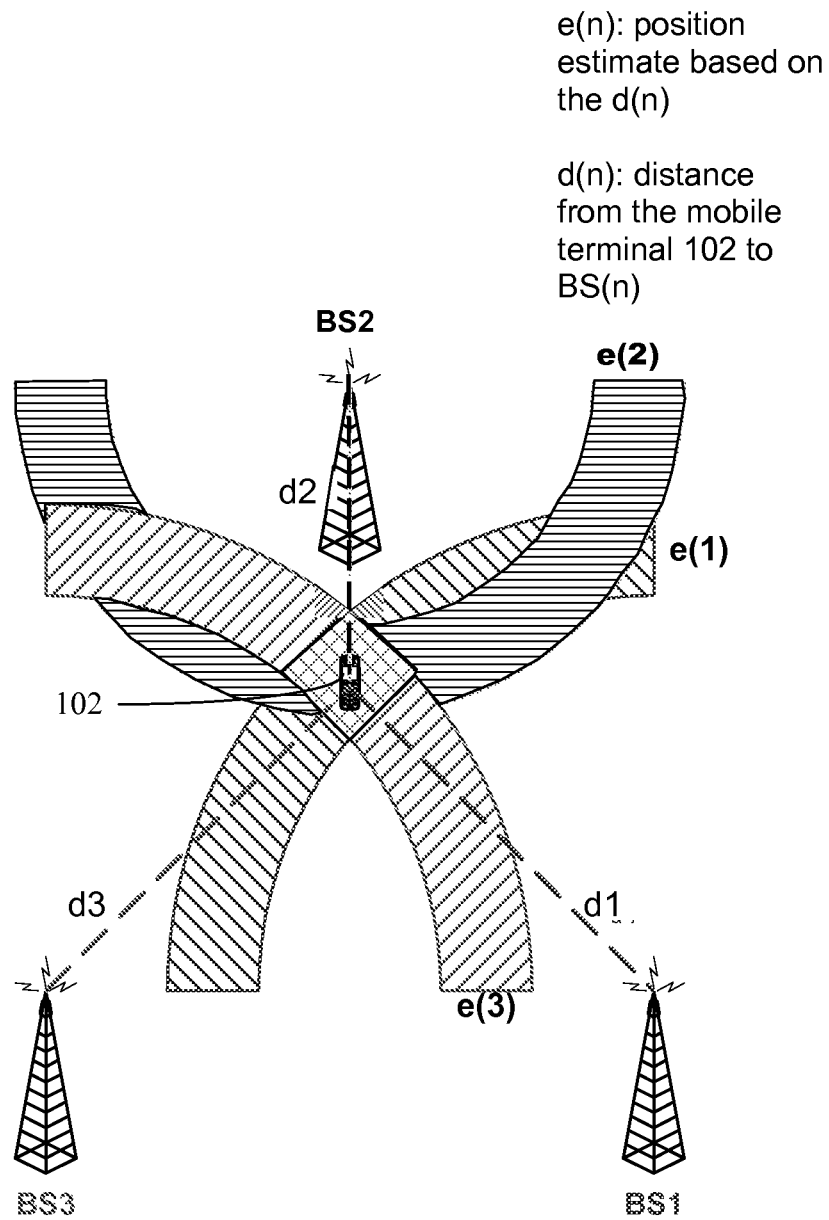
FIG. 1 is a schematic view illustrating the OTDOA system, according to the prior art.

Embodiments herein include a network node, such as a positioning target node, that advantageously obtains more information on neighbor cells than what is provided by the network, e.g. when experiencing high interference. The network node in question may be e.g. a UE, a terminal, a sensor, a relay, a small base station, or any wireless network node capable of receiving neighbor cell lists and performing measurements of a specified measurement category.

Such extended neighbor cell information, e.g. lists of a plurality of cells and their associated cell-specific information, may also be useful in some dense deployments and heterogeneous networks, such as when neighbor cell lists are not dynamically updated by the network, while at the same time some type of dynamic interference coordination is deployed in the network. Further, enabling expansion of neighbor cell sets or lists may be advantageous when a network comprises many cells with restricted access, or when there are cells that are not controlled by the network but which are good to measure on when they are on, such as e.g. user-deployed home NodeBs.

Further, it is realized that even though PRSs have been specifically designed for positioning measurements and in general are characterized by better signal quality than other reference signals, the standard does not require or mandate the use of PRSs for positioning measurements. Other types of reference signals, e.g. cell-specific reference signals (CRS), can in principle also be used for performing positioning measurements. Hence, embodiments herein obtain and use other information related to, and/or associated with, the identity of neighbor cells, in addition to the information e.g. provided by the network, related to PRS signals and/or positioning in general.

For LTE, the standard also specifies other neighbor cell lists than the list used to assist positioning measurements, which was mentioned above. These other lists can be used for, e.g. mobility measurements, general RRM (Radio Resource Management) or O&M (Operations & Maintenance) purposes or SON (Self Organizing Network) operation. In LTE, the neighbor cell list for mobility measurements is optional in the sense that a UE is required to meet the cell search requirements within a certain explicit neighbor cell list, but the network does not automatically provide the UE with the list. The maximum size of these neighbor cell lists is 16 cells for intra-frequency measurements, i.e. 16 cells per intra-frequency carrier, and 16 cells for inter-frequency measurements per carrier. See, e.g., 3GPP TS 36.331, Evolved Universal Terrestrial Radio Access (E-UTRA); Radio Resource Control (RRC); Protocol specification.

Neighbor cell lists are also used in other cellular systems. For example, in CDMA2000 based systems, such as 1xRTT (1 times Radio Transmission Technology protocol) and HRPD (High Rate Packet Data); UTRAN (Universal mobile telecommunications system Terrestrial Radio Access Network), FDD (Frequency-Division Duplexing) and TDD (Time-Division Duplexing); and GSM (Global System for Mobile Communications), the maximum sizes of positioning neighbor cell lists included in the assistance data are 40 cells for AFLT (Advanced Forward Link Trilateration), 32 cells for OTDOA and 16 cells for E-OTD (Enhanced Observed Time Difference), respectively. Neighbor cell lists used for mobility in these three systems, namely CDMA2000, UTRAN and GSM, are mandatory and have the maximum sizes of 16 cells per carrier, 32 cells per carrier and 32 cells per GSM BCCH (Broadcast Control CHannel) carriers, respectively.

Consequently, at least in all technologies mentioned above, there are typically multiple neighbor cell lists per carrier frequency, which are intended to enable a UE to perform different types of measurements. Typically, there is a one-to-one mapping between a neighbor cell measurement category, or neighbor cell measurement type, and a neighbor cell list, i.e. the same neighbor cell list is only used for the UE measurements performed for a particular functionality.

Neighbor Cell Measurement Category and Neighbor Cell Lists

Henceforth, within this disclosure, the terms "measurement category" or "measurement type" will be used as referring to a set of measurements performed for the same functionality or feature. Examples of such functionalities are, e.g. mobility, positioning, tracking areas, O&M and SON or interference coordination in heterogeneous networks. Examples of different features are the possibility of taking measurements on PRSs and the possibility of taking measurements on CRSs. Further, the terms "set" and "list" will be used as follows: "a set" will be used as denoting a group or a number of cells, while "a list" will be used as denoting a record of cells, which record may be e.g. transmitted to another node.

Another possibility is to use different lists for taking positioning measurements on positioning reference signals on different physical antenna ports. Yet another non-limiting example is to use separate lists for positioning measurements for different types of nodes, e.g. one list for macro cells and another list, possibly dynamically created, i.e. not signaled but detected, for home NodeBs.

It should also be noted that when performing measurements on a cell comprised in a list or set of cells, the measurements are preceded by the detection of the cell. The detection is based on the information on the cell in the list. Thus, expressions and actions such as: "performing measurements on a cell in a list" may include the detection of the cell, based on the information on the cell in the list, when appropriate. The actual measurement then involves the measuring of one or more measurement quantities, or metrics, such as e.g. RSRP (Reference Signal Received Power), RSRQ (Reference Signal Received Quality) etc. The reported measurement includes the reporting of both cell identity and the value of the corresponding measurement quantity.

The following are typical examples of measurement categories:
  Neighbor cell mobility measurement category, including neighbor cell mobility measurements e.g. RSRP and RSRQ.
  Neighbor cell positioning measurement category, including neighbor cell positioning measurements e.g. RSTD.
  Other examples of measurement categories include:
  Self organizing network (SON) measurement category
  Tracking area measurement category
  Operations and Maintenance (O&M) measurement category
  Minimization of drive test measurement category For each of the above measurements categories, potentially, a distinct respective neighbor cell list may be provided, although the lists may overlap in terms of the included set of cells. The lists may also contain different cell-specific information associated with the cells in the list.

For example, in LTE, for performing positioning measurements over carrier frequency (F1), a neighbor cell list (L1P) is signaled from the network. At the same time, for performing neighbor cell mobility measurements over F1, another, optional, neighbor cell list (L1N) can be retrieved from the network. One key point to note is that L1P and L1N are independent of each other and may include different sets of cells. The different lists may contain common cell identities. However, some of the cells in the two lists in the above example may be distinct, i.e. only occurring in one of the lists. It is realized that, at least part of, the information comprised in this other, optional, neighbor cell list, L1N, could in fact be used together with, at least part of, the information comprised in the neighbor cell list for positioning, L1P, for performing neighbor cell positioning measurements. This or other examples of combined information related to neighbor cell identities could in fact be used also for performing measurements in other measurement categories, such as mobility measurements and/or SON measurements.

Embodiments herein advantageously enable the use of any neighbor cell list, or lists, as well as their combinations, to facilitate measurements belonging to a particular measurement category, even though the list or lists may be originally standardized to serve some other specific purpose. This enables a UE to detect and measure signals of cells over a larger number of cells, as compared to the number of cells comprised in the neighbor cell list provided by the network for the particular measurement category. Further, a UE may thus obtain the identities of neighbor cells which are more suitable for performing measurements than some of the cells comprised in the neighbor cell list provided for the particular measurement category. As explained in the preceding sections, a network provides a separate neighbor cell list for the performing of measurements belonging to a particular neighbor cell measurement category. The signaling or providing of some NCLs may be optional, i.e. the lists are only provided by the network upon request. On the other hand, not retrieving the optional neighbor cell lists may result in neighbor cell measurements of a quality that is insufficient in order to achieve an optimal, or even satisfactory, result.

In short, there exists a variety of different types of cell lists, which may be obtained in a number of different ways. With the growing variety of available services and the already high terminal and network complexity, it is practically impossible to standardize all the necessary types of neighbor cell lists, and to specify requirements for all possible scenarios. Thus, a flexible approach for forming and expanding neighbor cell sets or lists would be useful. Furthermore, there also exist a variety of services relying on neighbor cell measurements but which do not require standardization in general and could benefit from re-using existing lists that have not been originally standardized for such services.

Figure 2A:
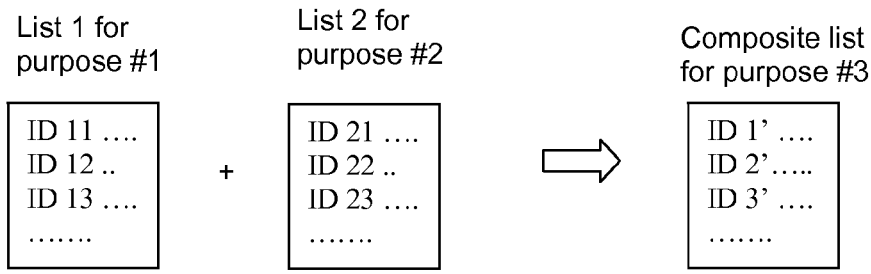
FIGS. 2a-c are exemplary schemes illustrating different variants of composite sets or lists derived when applying exemplary embodiments.

An exemplary method in a UE, according to an embodiment of the invention, involves using a neighbor cell list available for measurement category #1 as well as one or more other neighbor cell lists, available for other measurement categories, for performing neighbor cell measurements belonging to neighbor cell measurement category #1. The creation of a set or list of neighbor cells from a plurality of neighbor cell lists is illustrated in FIG. 2a.

Figure 2B:
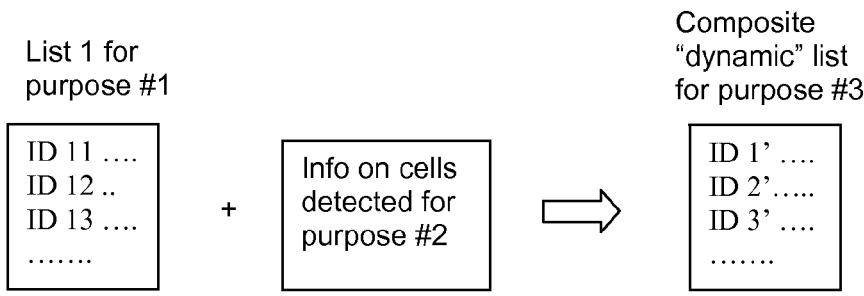
Figure 2C:
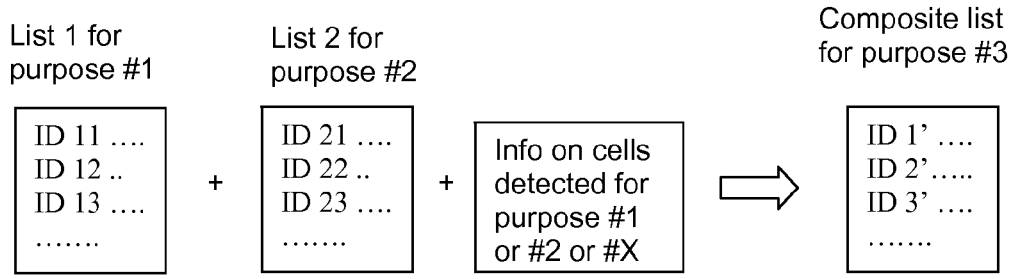

In another exemplary method embodiment, an expanded or combined neighbor cell list is created by combining detected cells, which are detected without support from an NCL, for a measurement category, e.g. for mobility measurements, with the cells comprised in an NCL obtained for another measurement category, e.g. positioning measurements. The expanded list may be used to perform measurements for mobility or positioning, or some other measurement category. This scenario is illustrated in FIG. 2b. Further NCLs or sets of detected cells may be involved when creating a combined set or list of neighbor cells, which is illustrated in FIG. 2c.

In yet in another embodiment, the UE may use various neighbor cell lists to verify detected cells. For instance, a cell detected for neighbor cell measurements in a certain measurement category can be verified by that it is included in a neighbor cell list for another measurement category, e.g. positioning measurement. If the detected cell is not included in any other list or set, it may be suspected that the cell is falsely detected, and the cell may be further verified, i.e. be proven to be correctly detected or be revealed as falsely detected, by use of another verification method.

Composite Neighbor Cell List

One example of how different cell information could be combined is in the form of a composite neighbor cell list. The term "composite neighbor cell list" is used as referring to a set of cells or a list, which is a combination of more than one available neighbor cell list, or at least parts thereof, where the lists are primarily signaled for different neighbor cell measurement categories, which is also illustrated in FIG. 8a. A UE could use such a composite neighbor cell list for performing neighbor cell measurements in a particular measurement category. The UE may use the composite neighbor cell list either for one measurement category or for a subset of measurement categories or even for all measurement categories.

Figure 3:
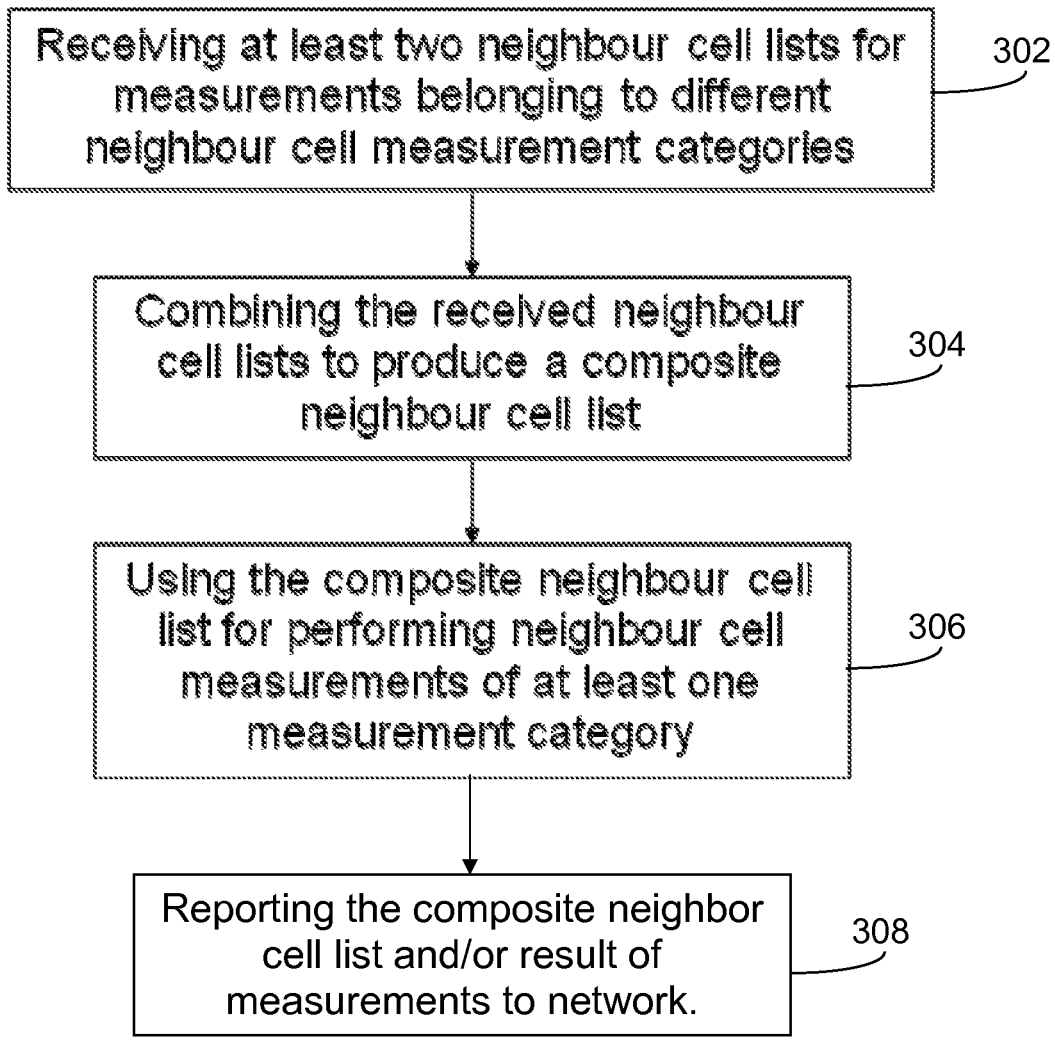
FIGS. 3-4 are flow charts illustrating possible procedures for combining information for performing measurements, according to optional embodiments.

Hence, as also illustrated in FIG. 3, an exemplary embodiment of a method in a UE comprises the steps of:

Receiving 302 at least two neighbor cell lists for performing neighbor cell measurements belonging to different neighbor cell measurement categories, Combining 304 the received at least two neighbor cell lists to produce a composite neighbor cell list, Using 306 the composite neighbor cell list for performing neighbor cell measurements for at least one measurement category.

Reporting 308 (optional) the composite neighbor cell list and/or the result of the performed measurements to one or more other nodes in the network A UE may generate the composite list ($\Psi_C$) by using the following generalized function:

$$\Psi_C = (\psi_1 \cup \psi_2 \cup \ldots \cup \psi_N) \quad (1)$$

where $\Psi_i$ is the neighbor cell list signaled by the network to the UE for measurement category i.

According to (1), N neighbor cells lists available for N different measurement categories are used for generating the composite neighbor cell list. The composite cell list ($\Psi_C$) is used by the UE for at least measurements belonging to one measurement category, which may or may not belong to the set N. To illustrate this point it is assumed that the composite neighbor cell list is generated using two available cell lists: one for the positioning measurement category and another one for the mobility measurement category. The UE may use this composite list for performing neighbor cell measurements. The UE may also use the same list for performing positioning measurements. In addition the UE may use the same list for performing other measurements, e.g., for SON or UE tracking area update.

It should be noted that the composite cell list may be generated by the UE from fewer than N neighbor cell lists. This embodiment is thus applicable when at least two neighbor cell lists for two different measurement categories are provided by the network.

This embodiment is elaborated by a particular example below.

Example Procedure, Composite Neighbor Cell List

It is assumed that at least two types of neighbor cell lists are provided by the network to a UE. For example, one list is a positioning neighbor cell list and another one is some other neighbor cell list, e.g. originally intended for mobility measurements, denoted $\psi_{pos}$ and $\psi_{mob}$, respectively. Note that the solution is neither limited to only two sets, nor requires using a positioning list as the first neighbor cell list and a mobility list as the other neighbor cell list.

In an exemplary embodiment, the transmission of neighbor cell lists, which are to be used for creating composite neighbor cell lists, but which are optional for the network to provide, can be triggered, e.g. by a UE or the network. As previously described, the transmission of mobility lists is optional in LTE, and must thus be triggered if to be used for creating e.g. a composite cell list. For example, the transmission of a mobility list could be triggered by any of the following:

a positioning session request or initiation, a network decision based on comparing the estimated and required positioning quality, where the positioning quality may be evaluated based e.g. on the comparison of the positioning configuration parameters (e.g., reference signal bandwidth, number of consecutive subframes for reference signal measurement, reference signal periodicity, etc.), experienced interference levels, number of cells in the list to the existing measurement requirements (e.g. RSTD accuracy, RSTD reporting delay, etc.).

The trigger may be used for a single-time transmission, a predetermined number of periodic transmissions, or an unknown number of periodic transmissions, which are to be stopped by either a stop trigger, based on a predetermined condition, or after a predetermined time period has elapsed.

Positioning neighbor cell lists are typically configured by a positioning server, such as the eSMLC (evolved Serving Mobile Location Center) or SLP (Secure user plane Location Platform) in LTE, while mobility neighbor cell lists are typically configured by some other network node, such as e.g. an evolved Node B (eNodeB) or an MME (Mobility Management Entity). When the lists serve different purposes or are used differently, the potential overlap between the lists may not be interesting. However, when the lists are to be used in combination, e.g. to form a composite neighbor cell list, it may be of interest to obtain as much valuable information as possible, and it is thus preferable to design the two lists with as little overlap as possible, in order to have as many neighbor cells as possible to select from. In the ideal case with no overlap between the lists, this would imply that the set intersection $\Psi_{pos} \cap \Psi_{mob}$ is an empty set. One way to obtain lists having as little overlap as possible is to make e.g. the mobility lists known in the positioning server. For example, the information of a mobility list could be collected in an eSMLC, either over the LPPa (LTE Positioning Protocol A) protocol from an eNodeB, or directly over LCS-AP (Location Services Application Protocol) protocol from an MME.

The two lists may be used in at least two ways:

All cells from the two lists (i.e. $\Psi_{pos} \cup \Psi_{mob}$) may be used for positioning measurements on the same type of reference signals, e.g., PRS or CRS;

Cells in different sets may be measured on different types of reference signals, e.g., cells in $\Psi_{mob}$ may be used for positioning measurements on CRS, while cells in $\Psi_{pos}$ may be used for positioning measurements on PRS, where:

all the cells may be measured during positioning subframes, the measurements on CRS may be conducted in any sub-frames, i.e. can start without waiting for the next positioning occasion, the cells with the best estimated signal quality could be included in $\Psi_{mob}$ since the received signal quality, or "hearability", of CRSs, typically, is worse than that of PRS, in yet another embodiment reference signals used for measuring cells in $\Psi_{mob}$ are not transmitted from cells included in $\Psi_{pos}$ and vice versa, while the set consistency over all simultaneously measuring UEs is ensured globally, in yet another embodiment, cells in the set which is not designed originally for positioning ($\Psi_{mob}$) are measured both for positioning and for the original purpose (mobility).

When using other-purpose neighbor cell lists for positioning, one needs to keep in mind that even though the neighbor cells become known to the UE, the network will not send positioning assistance data for those cells. Therefore, the cell search for signals used for positioning will have to be done blindly for those cells that are not in the positioning neighbor cell list, which should not be a problem if the signal quality for those cells is reasonably good.

The positioning measurements are to be reported for cells comprised in the composite list, but not necessarily for all of them. In one example embodiment, the UE selects the X best cells based on a predefined criterion, e.g. related to measurement quality or signal quality.

When using, for mobility measurements, at least some cells from either $\Psi_{pos}$ only, or from both $\Psi_{pos}$ and $\Psi_{mob}$, the mobility measurements could also be conducted during positioning subframes, which are indicated in the positioning neighbor cell list for each cell in the set $\Psi_{pos}$ and which subframes may have better interference conditions compared to other subframes. In a similar way, the UE may use cells that belong to $\Psi_{pos}$ for positioning measurements in low transmission activity subframes configured for heterogeneous networks in cells $\Psi_{het}$. However, the UE behavior may need to be adapted accordingly, since the UE should be able to associate the restricted measurement occasions with cells received in a list for a different purpose.

Composite Dynamic Neighbor Cell List

For some measurement categories, such as e.g. the mobility measurement category, NCLs are not necessarily signaled to a UE by the network, as previously described. Thus, when no NCL for mobility measurements is provided, the UE has to blindly detect neighbor cells for mobility measurements. However, for other types of measurement categories, such as e.g. the positioning measurement category, the network is obliged to provide a neighbor cell list. The concept of a composite dynamic neighbor cell list implies enabling a UE to dynamically, i.e., "on the fly," create a composite neighbor cell list by combining any available neighbor cell list with one or more blindly detected cells. The thus dynamically created composite neighbor cell list can then be used for performing positioning measurements, which is also illustrated in FIG. 2b.

Figure 4:
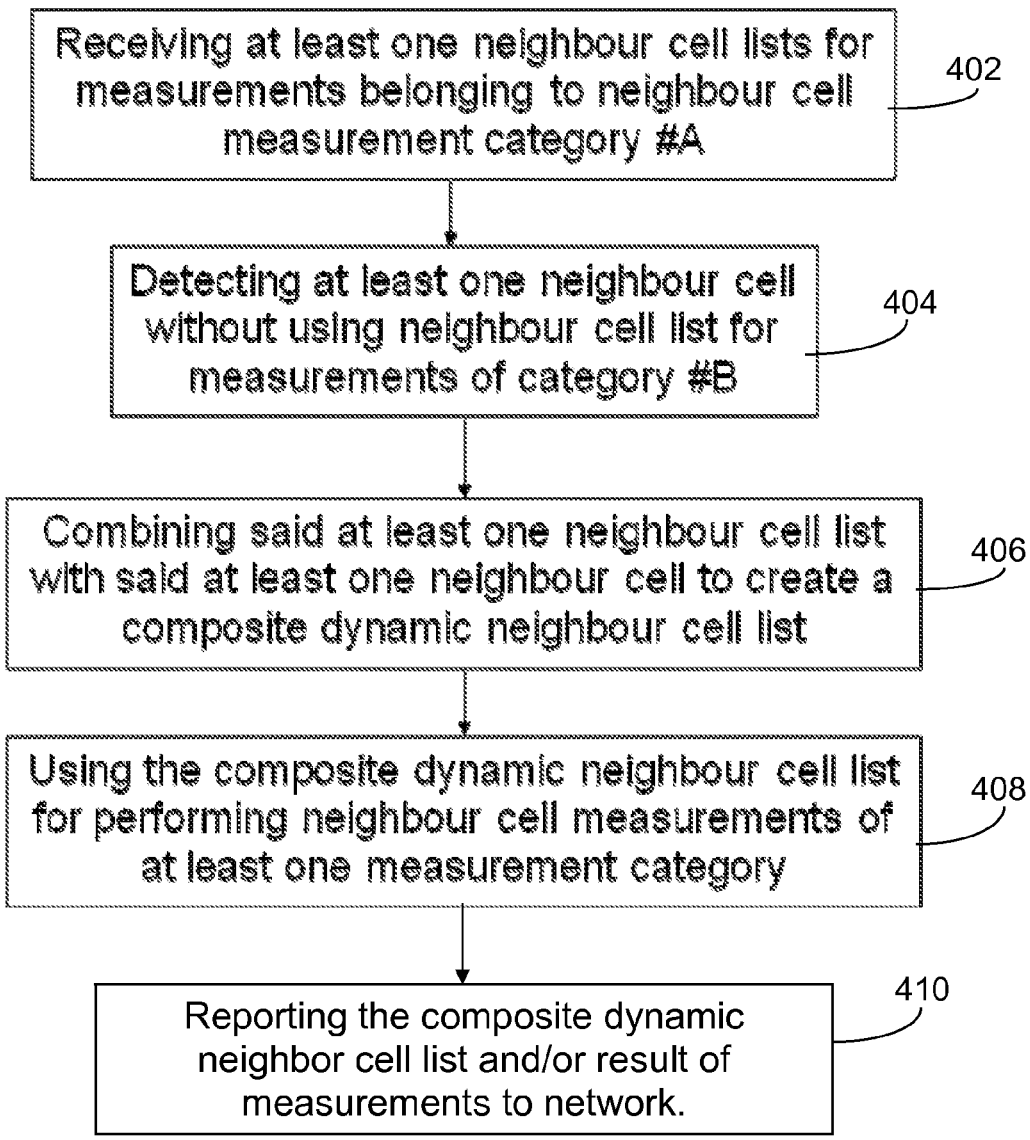

Hence, as also illustrated in FIG. 4, an exemplary embodiment of the method of dynamically creating an NCL in a UE and using said dynamically created NCL in the UE may comprise the steps of:

Receiving 402 at least one neighbor cell lists for performing neighbor cell measurements belonging to neighbor cell measurement category #A (e.g. positioning measurement category).

Detecting 404 at least one neighbor cell, without using neighbor cell list for performing measurement of category type #B (e.g. mobility measurement category), which is different than category #A.

Combining 406 the received at least one neighbor cell list for neighbor cell measurement category #A with the at least one detected cell for performing measurement of category #B, which may also be stored in a list, to create a composite dynamic neighbor cell list.

Using 408 the composite dynamic neighbor cell list for performing neighbor cell measurements of at least one measurement category e.g. type #A or type #B or for another measurement category, e.g. #C or #D.

Reporting 410 (optional) the composite dynamic neighbor cell list and/or the result of the performed measurements to one or more other nodes in the network.

The UE may generate the composite dynamic list ($\Psi_{Cd}$) by using the following generalized function:

$$\Psi_{Cd} = (\Omega_1 \cup \Omega_2 \cup \ldots \cup \Omega_K \cup \psi_1 \cup \psi_2 \cup \ldots \cup \psi_N) \quad (2)$$

where $\Omega_j$ is the list of cells detected by the UE without using neighbor cell list signaled for performing measurement of neighbor cell measurement category j, and where $\Psi_i$ is the neighbor cell list signaled by the network to the UE for performing measurement of neighbor cell measurement category i.

The composite dynamic neighbor cell list could be reported to other nodes in the network, if desired. The list could be stored in another node, and the information comprised in the list could be used e.g. when producing assistance data or other neighbor cell lists to the UE or another node. The result of the performed measurements could also be reported to another node, e.g. for further processing and/or for being evaluated. This embodiment is explained by the following example:

Example

Composite Dynamic Neighbor Cell List

In LTE, typically, no mobility measurement neighbor cell list is signaled for mobility measurements. The UE therefore blindly detect cells for mobility measurements by performing correlation over all possible PCIs, e.g. 504 PCIs. The UE is required to identify up to 8 intra-frequency cells provided their received quality is above a certain threshold, e.g. $SINR_{thresh} = 6$ dB.

On the other hand, for positioning measurements the UE receives a neighbor cell list, whose size is 24 cells per carrier frequency.

The procedures of detecting cells for mobility measurement and for positioning measurement operate in parallel. Therefore, in an extreme case, the detected cells for mobility measurements may completely differ from the cells included in the positioning neighbor cell list. Hence, in an example where the composite dynamic NCL is the union of the detected cells for mobility and the cells comprised in the NCL for positioning, the composite dynamic NCL would comprise 8+24=32 cells for a frequency carrier when the two lists do not overlap. These 32 cells could be used, for instance, for performing positioning measurements and/or for performing mobility measurements. Alternatively, a subset of the 32 cells, e.g. the "best" ones thereof, according to a predefined criterion, could be used for performing measurements Exemplary Arrangement, FIG. 5

Figure 5:
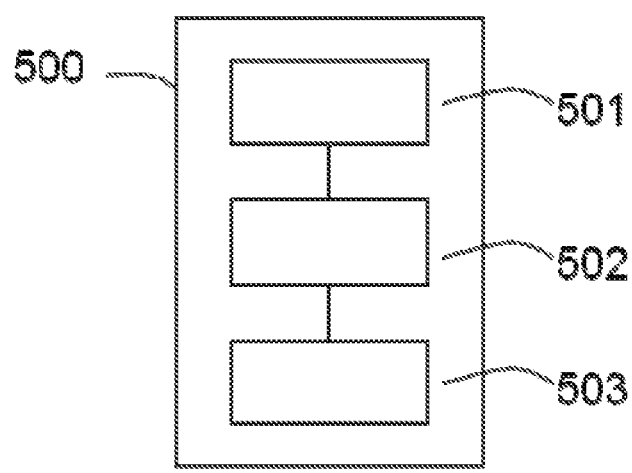
FIG. 5 is a block diagram illustrating an arrangement adapted for combining neighbor cell lists, according to an exemplary embodiment.

FIG. 5 illustrates an arrangement 500 in a radio network, comprising means 501 for creating a composite neighbor list from a set of signaled and/or detected cells; means 502 for combining positioning neighbor lists with any other neighbor cell lists for performing neighbor cell measurements; and means 503 for usage of combined lists for performing positioning measurements and/or other measurements.

False Cell Detection

Figure 6:
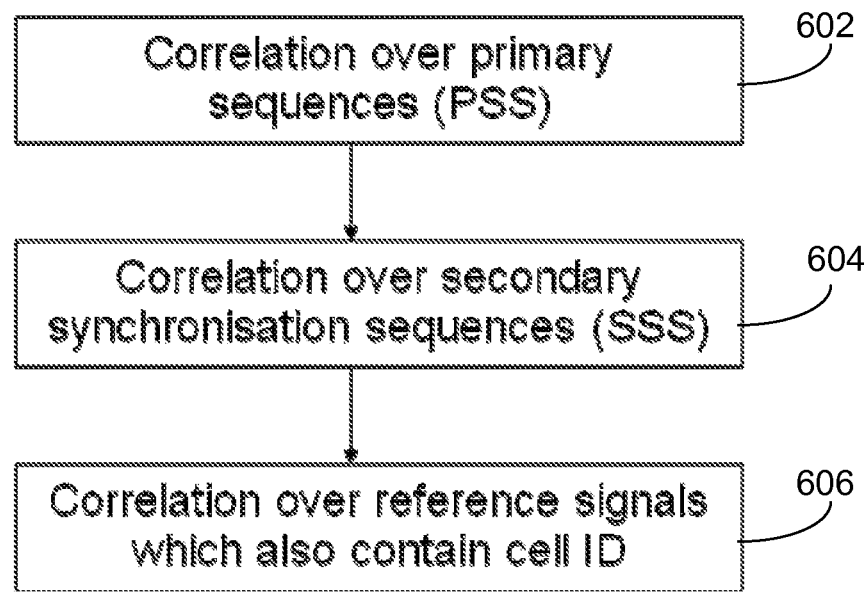
FIG. 6 is a flow chart illustrating different steps of cell verification, according to the prior art.

The following describes two exemplary embodiments, namely:

false cell detection using neighbor cell list
false cell detection using detected cells False cell detection using neighbor cell list: The idea of this embodiment is to use NCL for measurement category #A to check if there is a need for performing further verification of a cell, which is detected, e.g. blindly or by use of an NCL for measurement category #B. As an example, the verification step is an optional step in LTE when detecting cells. As depicted in FIG. 6, in LTE, a cell can be fully identified in two steps by performing:

Step 1: correlation over primary sequences (PSS)
Step 2: correlation over secondary synchronization sequences (SSS).

However the UE can optionally perform further verification by using a third step:

Step 3 (optional): correlating over the reference signals, which are also characterized by cell ID—specific signal sequence.

When applying an embodiment for false cell detection, as the one described below, the third verification step is only performed when it is suspected that the detected cell is false. Unnecessary verifications, which increase the cell detection delay, can thus be avoided, thanks to this embodiment.

The method according to this exemplary embodiment of the invention for verifying detected cells in a UE comprises the steps of:

Receiving at least one neighbor cell list for performing neighbor cell measurements belonging to neighbor cell measurement category #A (e.g. positioning measurement category)

Detecting at least one neighbor cell either blindly or by using a neighbor cell list intended for performing measurements of category type #B (e.g. mobility measurement category)

Comparing the at least one detected neighbor cell for category type #B with the cells belonging to the neighbor cell list for performing measurement of category type #A (e.g. positioning measurement category), which is different from category #B Performing verification of the detected cell for measurement category #B if the said detected cell does not belong to, i.e. is not comprised in, the set of cells in the NCL for measurement category type #A.

A generalization of this embodiment is that the detected cell, which may be detected with or without assistance of a neighbor cell list, is compared with the cells in a composite NCL or composite dynamic NCL. Composite NCL and composite dynamic NCL have been described above.

False cell detection using detected cells: This exemplary embodiment is similar to the previously described embodiment, except for that the detected cell for measurement category #B is instead compared with one or more cells, which are detected for measurement category #A. The identities of the cells detected for measurement category #A may e.g. be stored as a list. When the cell, which is detected for measurement category #B, is not present among the cells detected for measurement category #A, e.g. does not belong to the list of cells for measurement category #A, then the UE performs the third verification step to verify the cell detected for measurement category #B.

The method according to this exemplary embodiment of the invention for verifying the detected cells in UE comprises the steps of:

Detecting at least one neighbor cell, without support from a neighbor cell list, for performing neighbor cell measurements belonging to neighbor cell measurement category #A (e.g. positioning measurement category).

Detecting at least one neighbor cell, either blindly or by using a neighbor cell list, for performing measurement of category #B (e.g. mobility measurement category)

Comparing the at least one detected neighbor cell for category type #B with the detected cells detected for performing measurement of category type #A (e.g. positioning measurement category), which is different than category #B Performing verification of the cell detected for measurement category #B if said detected cell is not present among the one or more cells detected for measurement category type #A.

This embodiment could be generalized to that the cell detected (with or without neighbor cell list) for measurement category #B is compared with a combined set of cells detected for more than one different measurement categories, which are different from measurement category #B (e.g. combined set of cells detected for, or belonging to, measurement category #A and category #C, respectively.

In order to reduce the number of redundant or misleading verification conclusions, the UE could in an alternative embodiment make a decision on whether e.g. cells detected for measurement category #A and/or cells detected for measurement category #B should be used for comparisons for false cell detection. For example, the decision may be based on either the estimated or experienced detection quality or reliability for the two categories.

This concept will be further explained and exemplified below, in conjunction with the FIGS. 7-9.

Figure 7:
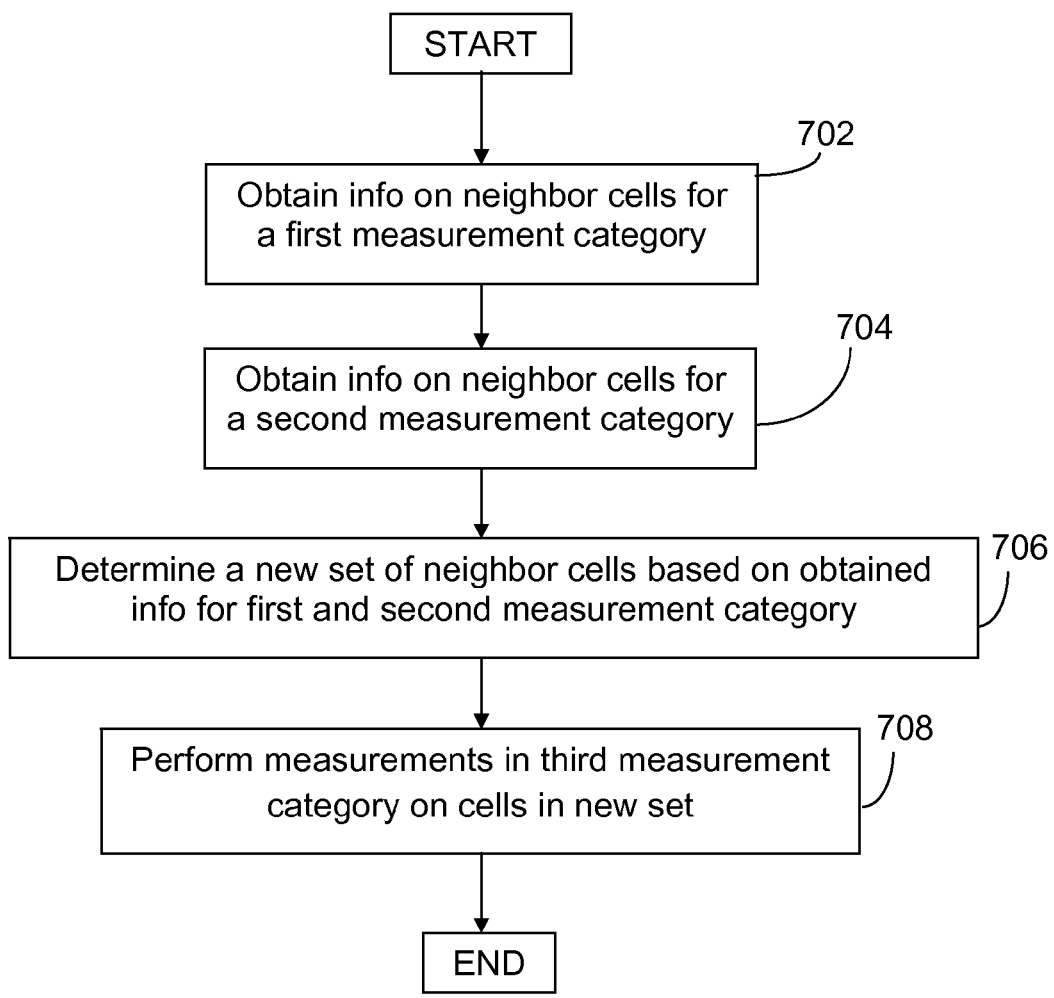
FIGS. 7-8 are flow charts illustrating procedures for combining information for performing measurements, according to further possible embodiments.

Example Procedure, FIG. 7

An exemplary embodiment of the procedure of combining information related to neighboring cells will now be described with reference to FIG. 7. The procedure could be performed in a node, such as e.g. a mobile terminal/UE, a base station or a relay node. Initially, information related to the identities of a first set of one or more neighboring cells is obtained in an action 702, which information is obtained for performing measurements in a first measurement category. Further, information related to the identities of a second set of one or more neighboring cells is obtained in an action 704, which information is obtained for performing measurements in a second measurement category. Then, a new, third set of neighboring cells is determined, based on at least part of the information on cells in the respective first and second set, in an action 706. This could also be expressed as determining a new set of cells based on, at least parts of, the information obtained for the first and second measurement categories. Then, measurements in a third measurement category are performed on at least part of the cells in the third set of neighboring cells, in an action 708. For example, the third set may comprise the "best" cells, according to a predefined criterion, from the first and second set. Measurements may then be performed, e.g. on the "best" of the cells in the third set, or a predefined number of the cells in the third set.

The information related to the first and second set, respectively, may be received in an NCL or retrieved through at least partly blind detection. The respective first and second set may, in this and other embodiments, comprise one or more cells. The information related to the sets may thus identify one or more neighbor cells, either directly, by comprising the identity, e.g. the PID, of the cell(s), or indirectly by comprising information from which the identity of the cell(s) may be derived.

Figure 8:
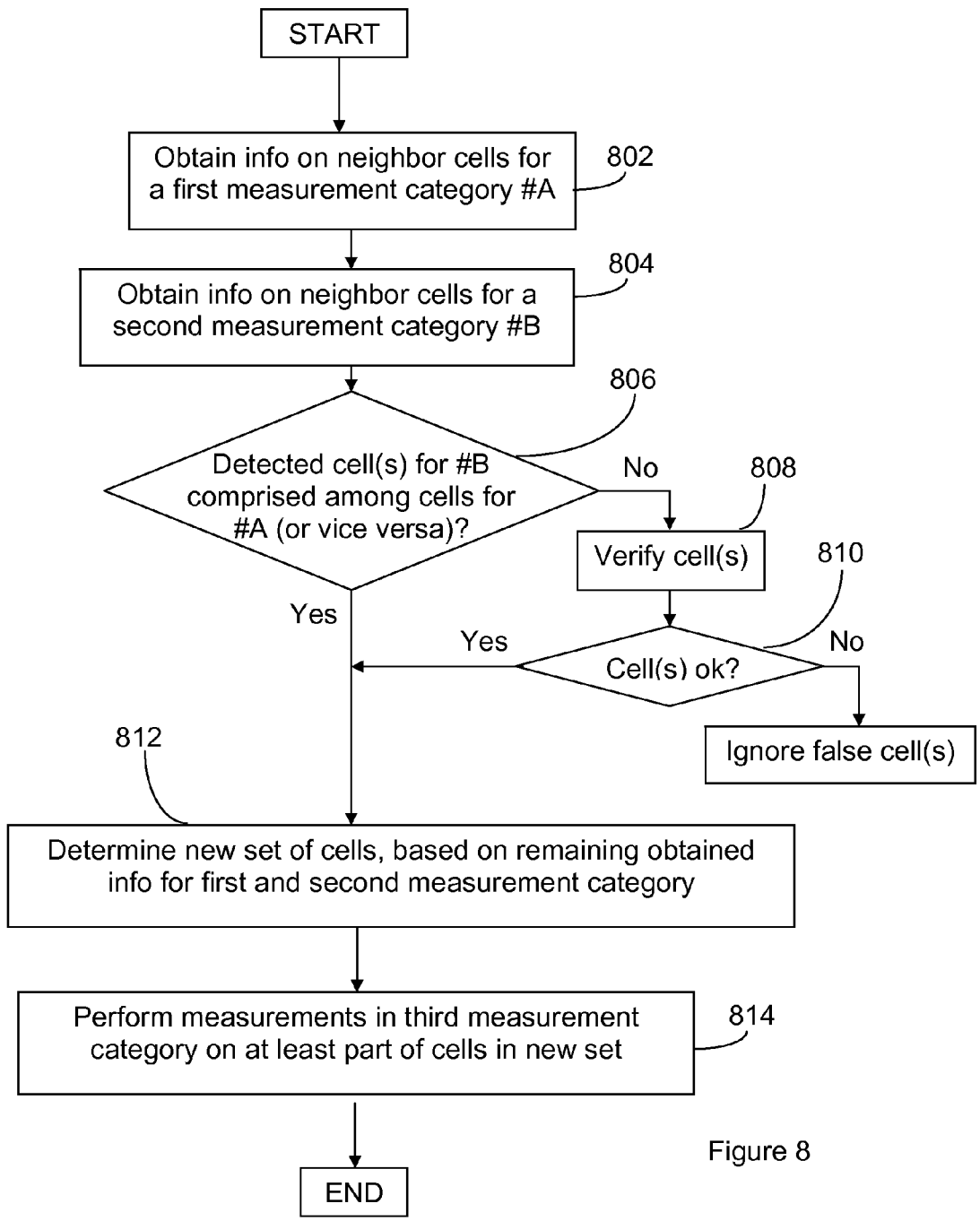

Example Procedure, FIG. 8

The example procedure illustrated in FIG. 8 comprises actions corresponding to the ones of the procedure illustrated in FIG. 7, but also further comprises a feature assisting the verification of detected cells. The feature involves that the ID of a cell detected for a first measurement category, #A, may be compared to the cell IDs comprised in a set of neighbor cells, e.g. a neighbor cell list obtained for a second measurement category, #B, in order to find out whether the cell may be suspected to be falsely detected. In the example shown in FIG. 8, it is assumed that a neighbor cell list is obtained in an action 802, for performing measurements in measurement category #A, and that neighbor cells are blindly detected in an action 804, for performing measurements in measurement category #B. This is, however, only an example. The cell ID of the blindly detected cell or cells may then be compared to the cell IDs comprised in the neighbor cell list obtained for measurement category #A. When the cell ID of a blindly detected cell is not comprised in the neighbor cell list for measurement category #A, it may be suspected that the cell is falsely detected, and further verification of said detected cell may be performed in an action 808. Thus, verification is only performed when there is reason to suspect that a cell is falsely detected. There may be cells, for which such a further verification is not relevant. Such cells could be identified, e.g. before action 808, and be ignored or handled in some other way (not shown), without performing the verification action 808.

The result of the verification is evaluated in an action 810. When the result of the verification of a detected cell is negative, i.e. the cell is found to be falsely detected, this cell is ignored, and not considered as a candidate for measurements. When the result of the verification is positive, i.e. the cell is found to be correctly detected, the cell ID remains among the candidate cells for a third set of cells, on, at least part of, which to perform measurements for a third purpose or measurement category.

A third set of neighbor cells may then be determined or formed by combining some or all of the remaining detected candidate cells with at least part of the neighbor cell list obtained for measurement category #A. The cell IDs, or similar, of the third set of neighbor cells may be stored in a composite dynamic neighbor cell list, which could be used as base for performing measurements and/or which could be provided to other nodes in the network. The third set of neighbor cells may be determined in an action 812. Measurements for a third measurement category on at least part of the cells in the third set of cells may be performed in an action 814.

Figure 9:
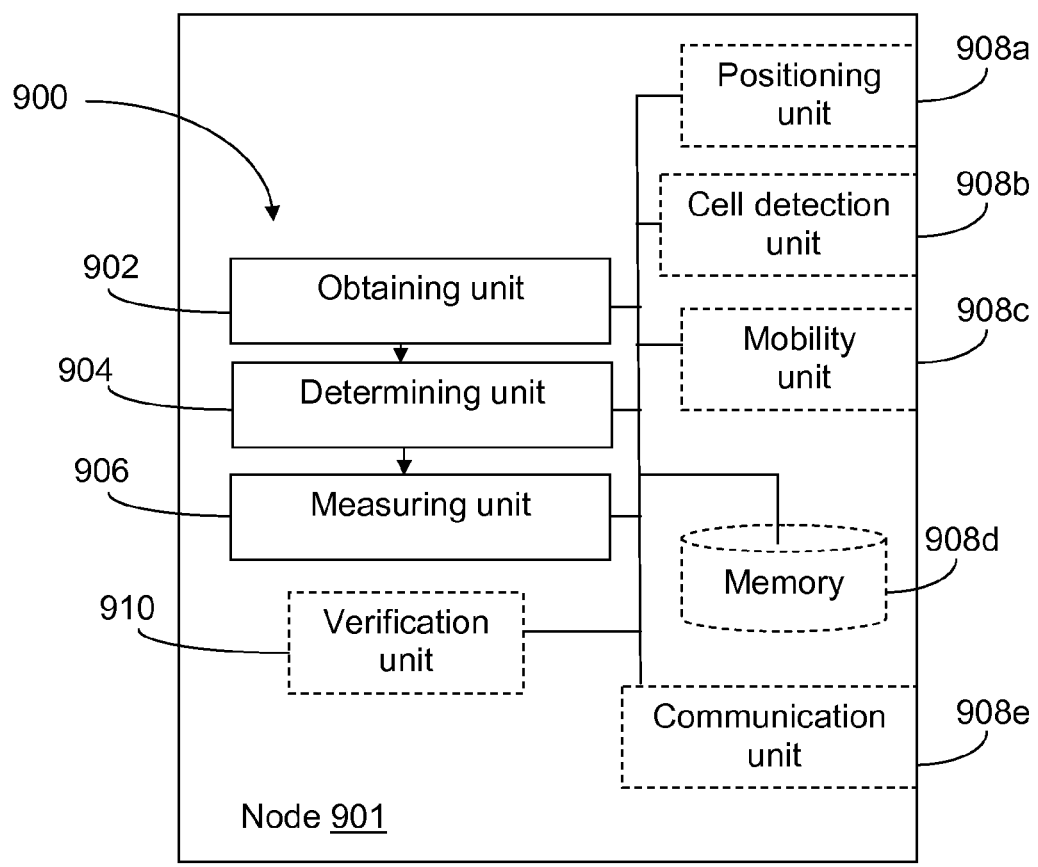
FIG. 9 is a block diagram illustrating an arrangement adapted for combining information for performing measurements, according to an exemplary embodiment.

Example Arrangement, FIG. 9

Below, an exemplary arrangement 900, adapted to enable the performance of the above described procedures of combining information, will be described with reference to FIG. 9. The arrangement is illustrated as being located in a node 901, such as, e.g. a mobile terminal/UE, a base station or a relay node. The arrangement 900 comprises an obtaining unit 902, which is adapted to obtain information related to the identities of a first set of one or more neighboring cells for performing measurements in a first measurement category. The obtaining unit 902 is further adapted to obtain information related to the identities of a second set of one or more neighboring cells for performing measurements in a second measurement category.

The arrangement 900 further comprises a determining unit 904, adapted to determine a third set of neighboring cells based on at least parts of the obtained information related to the first and second set. The cells comprised in the third set may e.g. be the neighbor cells, comprised in the first and/or second set, from which a received signal has the highest effect, as previously described. Alternatively, the third set may be formed e.g. as (first set∪second set), i.e. comprising all cells comprised in the first and second set, except for cells found to be falsely detected. The arrangement 900 further comprises a measuring unit 906, which is adapted to perform measurements in a third measurement category on at least part of the cells in the third set of neighboring cells.

The first, second and third measurement categories may be different, or, two of them, or all three, may be the same. Further, additional information related to other measurement categories may also be involved in the determining or compilation of the third set of neighboring cells. The information related to the first and second set, respectively, may be received in an NCL or retrieved through at least partly blind detection.

The arrangement 900 may further be adapted to or comprise further functional units adapted to assist the process of verifying detected cells, e.g. as described in conjunction with FIG. 8, such that a certain particular verification, e.g. "step 3" 606 illustrated in FIG. 6, only is performed when there is reason to suspect that a cell is falsely detected. The arrangement could further be adapted to, or comprise further functional units adapted to, create NCLs of detected neighboring cells or to create new NCLs from combinations of, at least part of, information related to neighboring cells, obtained for different measurement categories, e.g. as previously described. A created list could be used when performing measurements, e.g. as constituting the set of neighboring cells on which measurements in a certain category are to be performed, or as base for the selection of a set of neighboring cells on which to perform measurements. The arrangement 900 could also be adapted to provide such a created list to other nodes, e.g. for storage, or for use of the information in the list when building up assistance data. The arrangement could further be adapted to request information on the cells comprised in a created list when providing the list to another node. The arrangement could further be adapted to trigger the transmission of an NCL from another node, and to receive said NCL, and to, e.g. include parts thereof in the third set.

The node may further comprise functional units adapted to support and/or execute the different categories of features for which measurements are performed in the measuring unit 906. Such units are illustrated by the units 908*a-e* having a dashed outline.

Figure 10:
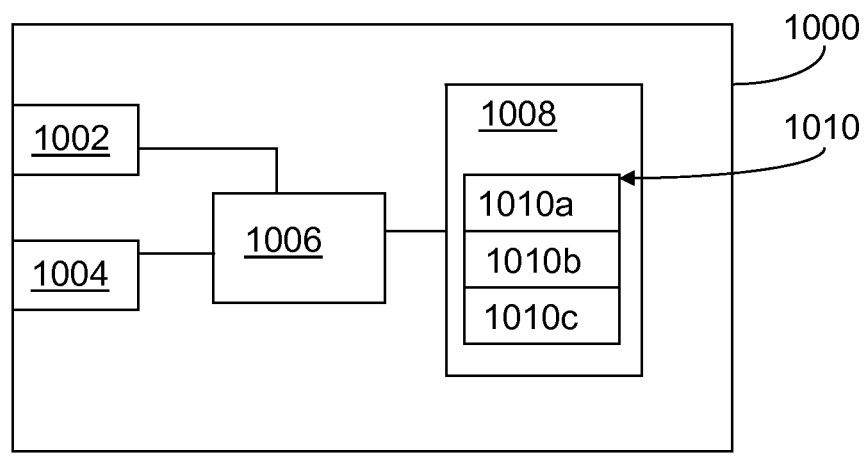
FIG. 10 is a schematic view illustrating an arrangement in a node, according to an exemplary embodiment.

Example Arrangement, FIG. 10

FIG. 10 schematically shows an embodiment of an arrangement 1000 in a node, which also can be an alternative way of disclosing an embodiment of the arrangement adapted to combine information on neighbor cells for performing measurements illustrated in FIG. 9. Comprised in the arrangement 1000 are here a processing unit 1006, e.g. with a DSP (Digital Signal Processor) and an encoding and a decoding module. The processing unit 1006 can be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a disk drive. The computer program product 1008 comprises a computer program 1010, which comprises code means, which when run in the processing unit 1006 in the arrangement 1000 causes the arrangement and/or the node to perform the actions of the procedures described earlier in conjunction with FIG. 10.

The computer program 1010 may be configured as a computer program code structured in computer program modules. Hence in the exemplary embodiments described, the code means in the computer program 1010 of the arrangement 1000 comprises an obtaining module 1010*a* for obtaining information on neighboring cells, e.g., receiving neighbor cell lists from another node or detecting neighbor cells blindly. The computer program may further comprise a determining module 1010*b* for determining a new set of neighboring cells based on the previously obtained information. The determining module may further determine e.g. whether a certain verification step should be performed for a detected cell. The computer program 1010 further comprises a measuring module 1010*c* for performing measurements in a certain measurement category on at least part of the new set of neighboring cells.

The modules 1010*a-c* could essentially perform the actions of the flows illustrated in FIGS. 7 and 8, to emulate the arrangement or node illustrated in FIG. 9. In other words, when the different modules 1010*a-c* are run on the processing unit 1006, they correspond to the units 902-906 of FIG. 9.

Although the code means in the embodiment disclosed above in conjunction with FIG. 10 are implemented as computer program modules which when run on the processing unit causes the arrangement and/or node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the data receiving unit.

Figure 11:
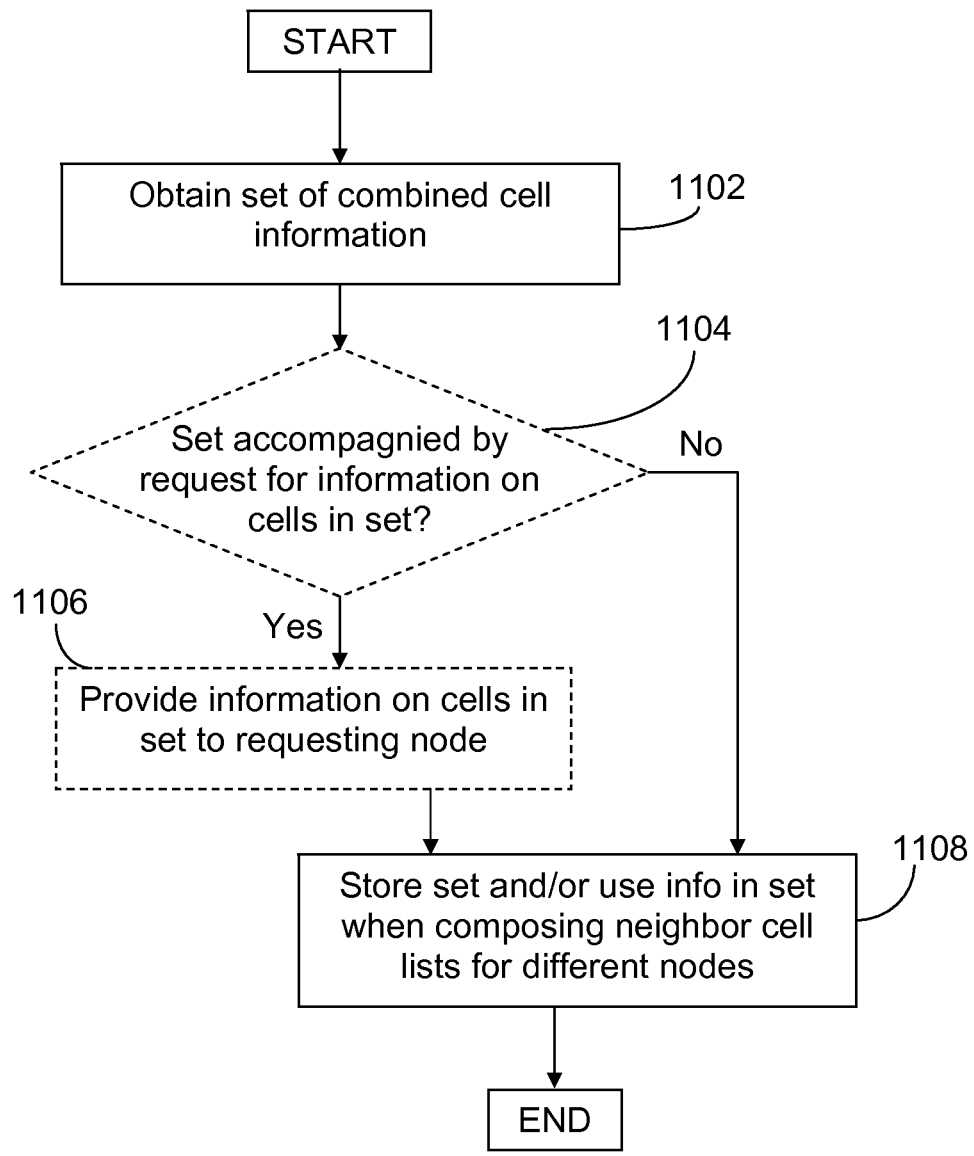
FIG. 11 is a flow chart illustrating a procedure of obtaining and using a combined list of cells, according to an exemplary embodiment.

Exemplary Procedure, FIG. 11

As previously described, a combined set or list could be provided to another node. Below, an exemplary embodiment of a procedure in a node adapted to receive such a combined set or list will be described with reference to FIG. 11. The node which receives the list or set may e.g. be a positioning node, which assists nodes to be positioned.

A combined list or set of neighbor cells provided by a first node (i.e. neighbors of the first node), which have compiled said list or set based on different sets of cells, as described above, may be obtained in a first action 1102. The list or set could e.g. be received directly from the first node, or be retrieved from an intermediate node or a memory. Further, it may be determined in an action 1104 whether the obtained list is associated with a request for information on the cells in the list. If the list is associated with such a request, information on the cells in the list may be provided to the requesting node in an action 1106. Further, the list may be stored for later use or distribution, and/or be used when neighbor cell lists are prepared or compiled for delivery to other nodes or for use within the node. Such neighbor cell lists may prepared for use for a number of different measurement categories. Access to the information in the obtained combined list will enable the node to provide an accurate selection of neighbor cells which is adapted for a particular purpose.

Figure 12:
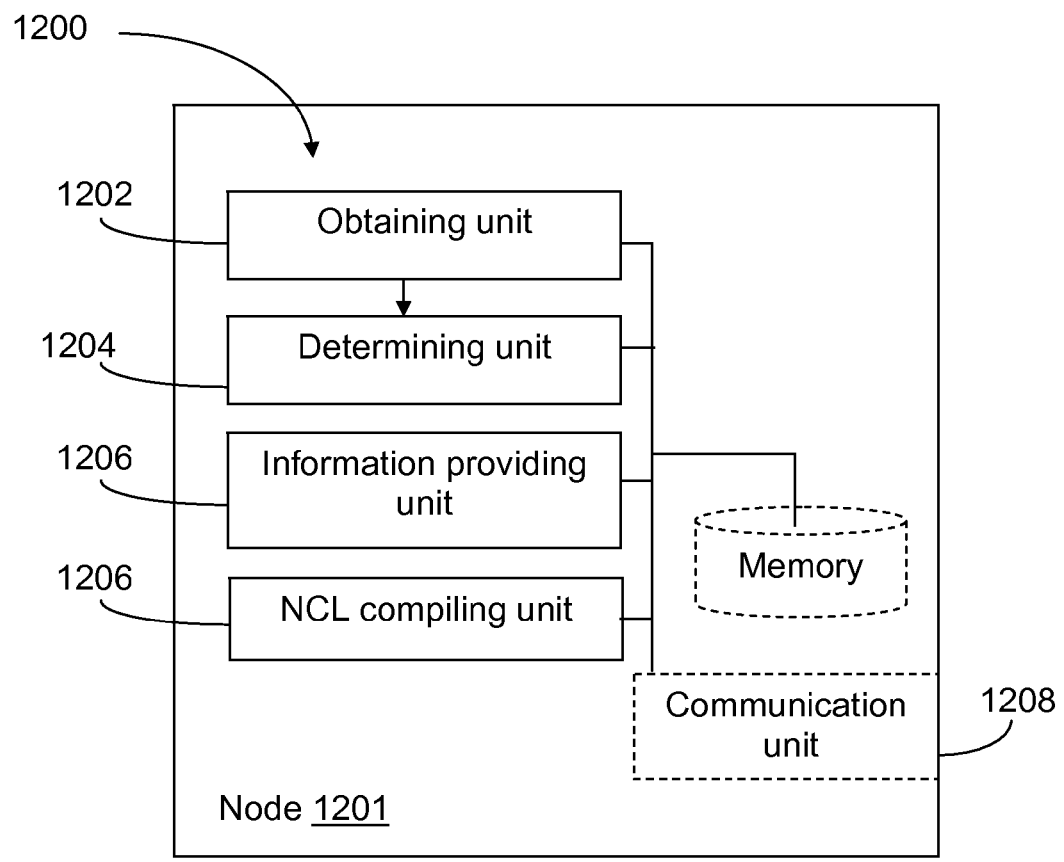
FIG. 12 is a block diagram illustrating an arrangement adapted for obtaining and using a combined list of cells, according to an exemplary embodiment.

Exemplary Arrangement, FIG. 12

Below, an exemplary arrangement 1200, adapted to enable the performance of the above described procedures of obtaining a combined list or set of neighboring cells, and using said list or cell, will be described with reference to FIG. 12. The arrangement is illustrated as being located in a node 1201, such as, e.g. a positioning node or a base station.

The arrangement 1200 comprises an obtaining unit 1202, which is adapted to obtain a combined list or set of neighboring nodes of a first node, provided by the first node, which list or set is combined by the first node from different sets of neighbor cell information. The arrangement 1200 may further comprise a determining unit 1204, adapted to determine whether information on the obtained list of cells is requested by the first node. The arrangement 1200 may further comprise an information providing unit, adapted to provide information to the first node, if information is found to be requested.

The arrangement 1200 may further comprise a storage unit, such as a memory, for storing of the obtained list. The arrangement 1200 may further comprise a neighbor cell compiling unit, adapted to use the information on cells in the obtained list when preparing or compiling neighbor cell lists for delivery to other nodes or for use within the node. Such neighbor cell lists may prepared for use for a number of different measurement categories.

While the procedures as suggested above have been described with reference to specific embodiments provided as examples, the description is generally only intended to illustrate the inventive concept and should not be taken as limiting the scope of the suggested methods and arrangements, which are defined by the appended claims. Even though the exemplary methods and arrangements have mainly been described using LTE terminology, the invention is also applicable to other cellular communications systems and technologies, such as e.g. CDMA2000, UTRAN and GSM, etc.

It is also to be understood that the choice of interacting units or modules, as well as the naming of the units are presented in this description only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities. The different features of the exemplary embodiments described above may be combined in different ways according to need, requirements or preferences.

The invention claimed is:

1. A method in a first node in a cellular communication network, the method comprising:
   obtaining information related to identities of a first set of one or more neighboring cells for a first measurement category,
   obtaining information related to identities of a second set of one or more neighboring cells for a second measurement category, wherein a measurement category is a set of measurements performed for the same feature or functionality and wherein the second measurement category is different from the first measurement category,
   determining a third set of neighboring cells based on at least parts of the obtained information related to the identities of the first and second sets of neighboring cells, and
   performing measurements in a third measurement category on at least part of the cells in the third set of neighboring cells.

2. The method according to claim 1, wherein the third measurement category is different from the two other measurement categories.

3. The method according to claim 1, wherein the third measurement category is the same as the first measurement category.

4. The method according to claim 1, wherein obtaining information related to the identities of a first set of neighboring cells comprises receiving a first list of neighboring cells from another node.

5. The method according to claim 4, wherein said receiving comprises receiving the first list as assistance data for positioning measurements.

6. The method according to claim 4, wherein the first list is a list of neighboring cells transmitting Positioning Reference Signals.

7. The method according to any claim 1, wherein obtaining information related to the identities of a first set of neighboring cells comprises obtaining at least part of the information through detection.

8. The method according to claim 1, wherein obtaining information related to the identities of a second set of neighboring cells comprises receiving a second list of one or more neighboring cells from another node.

9. The method according to claim 1, wherein obtaining information related to the identities of a second set of neighboring cells comprises obtaining at least part of the information through detection.

10. The method according to claim 1, wherein determining said third set comprises combining at least part of the information related to the identities of the first set, and at least part of the information related to the identities of the second set, into a third list of neighboring cells for the third measurement category.

11. The method according to claim 10, further comprising providing the third list to a second node.

12. The method according to claim 1, wherein each of the measurement categories involves measurements, on neighboring cells, for one of the following purposes:
    positioning,
    mobility,
    Self Organizing Network (SON),
    Tracking area update,
    Operations and Maintenance (O&M),
    minimization of drive tests,
    network planning and optimization,
    interference coordination in heterogeneous networks.

13. The method according to claim 1, wherein the first node is one of the following:
    a mobile terminal,
    a base station,
    a relay node, or
    a positioning node.

14. The method according to claim 1, further comprising determining whether to perform a verification of a cell detected for the first or the second measurement category, based on the obtained information.

15. The method according to claim 14, further comprising performing verification of a cell, detected for the first or the second measurement category, when the identity of the cell is not present in the obtained information related to the identities of neighboring cells obtained for the other one of the first or the second measurement category.

16. The method according to claim 1, further comprising selecting for inclusion in the third set the neighboring cells identified both in the information related to the identities of the first set and in the information related to the identities of the second set.

17. The method according to claim 1, wherein obtaining information for the first measurement category, obtaining information for the second measurement category, or both comprises triggering the transmission of a neighbor cell list from another node.

18. The method according to claim 17, wherein said triggering comprises transmitting a positioning session request or initiation to said another node.

19. The method according to claim 17, wherein said triggering comprises comparing an estimated and a required positioning quality.

20. The method according to claim 1, wherein determining the third set comprises determining the third set based on the information related to the identities of the first set (Info1) and the information related to the identities of the second set (Info2), combined as: Info1∪Info2.

21. The method according to claim 20, further comprising verifying a cell detected for the first or the second measurement category when the identity of that cell is not present in the combined obtained information.

22. An arrangement in a first node in a cellular communication network, said arrangement comprising:
    an obtaining unit adapted to obtain information related to identities of a first set of one or more neighboring cells for a first measurement category, and further adapted to obtain information related to identities of a second set of one or more neighboring cells for a second measurement category, wherein a measurement category is a set of measurements performed for the same feature or functionality and wherein the second measurement category is different from the different measurement category,
    a determining unit adapted to determine a third set of neighboring cells based on at least parts of the obtained information related to the identities of the first and second sets of neighboring cells, and
    a measuring unit adapted to perform measurements in a third measurement category on at least part of the cells in the third set of neighboring cells.

23. The arrangement according to claim 22, wherein the first measurement category is different from the other two measurement categories.

24. The arrangement according to claim 22, wherein the third measurement category is the same as the first measurement category.

25. The arrangement according to claim 22, wherein the obtaining unit is adapted to obtain the information related to the identities of the first set by receiving a first list of neighboring cells from another node.

26. The arrangement according to claim 25, wherein the obtaining unit is adapted to receive the first list as assistance data for positioning measurements.

27. The arrangement according to claim 25, wherein the first list is a list of neighboring cells transmitting Positioning Reference Signals.

28. The arrangement according to claim 22, wherein the obtaining unit is adapted to obtain the information related to the identities of the first set through at least partly blind detection.

29. The arrangement according to claim 22, wherein the obtaining unit is adapted to obtain the information related to the identities of the second set by receiving a second list of neighboring cells from another node.

30. The arrangement according to claim 22, wherein the obtaining unit is adapted to obtain the information related to the identities of the second set through at least partly blind detection.

31. The arrangement according to claim 22, wherein the determining unit is further adapted to combine at least part of the information related to the identities of the first set, and at least part of the information related to the identities of the second set, to obtain a third list of neighboring cells for the third measurement category.

32. The arrangement according to claim 31, further comprising a communication unit adapted to provide the third list to a second network node.

33. The arrangement according to claim 22, where the measurement unit is adapted to perform measurements, on neighboring cells, in at least one of the following measurement categories:
positioning,
mobility,
Self Organizing Network (SON),
Tracking area update,
Operational and Measurement (O&M),
Minimization of drive test,
network planning and optimization,
interference coordination in heterogeneous networks.

34. The arrangement according to claim 22, wherein the first node is one of the following:
a mobile terminal,
a base station,
a relay node, or
a positioning node.

35. The arrangement according to claim 22, further comprising a verification unit adapted to determine whether to perform a verification of a cell detected for the first or the second measurement category, based on the obtained information.

36. The arrangement according to claim 35, wherein the verification unit is further adapted to perform a verification of a cell detected for the first or the second measurement category, when the identity of that cell is not present in the obtained information related to the identities of neighboring cells obtained for the other one of the first or the second measurement category.

37. The arrangement according to claim 22, wherein the determining unit is adapted to select for inclusion in the third set the neighboring cells identified both in the information related to the identities of the first set and in the information related to the identities of the second set.

38. The arrangement according to claim 22, wherein the obtaining unit is adapted to obtain the information for the first measurement category, the information for the second measurement category, or both by triggering the transmission of a neighbor cell list from another node.

39. The arrangement according to claim 38, wherein the obtaining unit is adapted to trigger the transmission by transmitting a positioning session request or initiation to said another node.

40. The arrangement according to claim 38, wherein said triggering comprises comparing an estimated and a required positioning quality.

41. The arrangement according to claim 22, wherein the determining unit is adapted to determine the third set based on a combination of the obtained information related to the identities of the first set (Info1) and the obtained information related to the identities of the second set (Info2), as: Info1∪Info2.

42. The arrangement according to claim 41, further comprising a verification unit adapted to perform a verification of a cell detected for the first or second measurement category when the identity of that cell is not present in the combined obtained information.

43. A method in a second node in a cellular communication network, the method comprising:
obtaining from a first node a list that includes cell identities for a first and a second measurement category, wherein a measurement category is a set of measurements performed for the same feature or functionality and wherein the first and second measurement categories are different, and
providing to the first node information on the cells having corresponding cell identifies in the list, or creating neighbor cell lists for the first node, or other nodes, based on the cell identifies in the list, or both.

44. The method according to claim 43, wherein the second node is a positioning node.

45. An arrangement in a second node comprising:
an obtaining unit adapted to receive from a first node a list that includes cell identities for a first and a second measurement category, and either or both of, wherein a measurement category is a set of measurements performed for the same feature or functionality and wherein the first and second measurement categories are different;
an information providing unit adapted to provide to the first node information on the cells having corresponding cell identifies in the list, and
a neighbor cell list compiling unit adapted to create neighbor cell lists for the first node, or other nodes, based on the cell identities in the list.

46. The arrangement according to claim 45, wherein the second node is a positioning node.

47. A computer program product stored on a non-transitory computer readable medium and comprising computer readable code that, when run by a processing unit of a first node in a cellular communication network, causes the first node to:
obtain information related to identities of a first set of one or more neighboring cells for a first measurement category,
obtain information related to identities of a second set of one or more neighboring cells for a second measurement category, wherein a measurement category is a set of measurements performed for the same feature or functionality and wherein the second measurement category is different from the first measurement category,
determine a third set of neighboring cells based on at least parts of the obtained information related to the identities of the first and second sets of neighboring cells, and
perform measurements in a third measurement category on at least part of the cells in the third set of neighboring cells.

48. A computer program product stored on a non-transitory computer readable medium and comprising computer readable code that, when run by a processing unit of a second node in a cellular communication network, causes the first node to:
obtain from a first node a list that includes cell identities for a first and a second measurement category, wherein a measurement category is a set of measurements performed for the same feature or functionality and wherein the first measurement category and the second measurement category are different, and
provide to the first node information on the cells having corresponding cell identifies in the list, or create neighbor cell lists for the first node, or other nodes, based on the cell identifies in the list, or both.

* * * * *